United States Patent
Riekkinen et al.

(10) Patent No.: US 9,084,185 B2
(45) Date of Patent: Jul. 14, 2015

(54) APPARATUS AND METHOD FOR CUBIC METRIC ESTIMATOR IN DUAL-CARRIER AND MULTI-CARRIER WIRELESS COMMUNICATION SYSTEM

(75) Inventors: Ville Riekkinen, Oulu (FI); Mika Ventola, Oulu (FI); Teemu Sipila, Oulunsalo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 305 days.

(21) Appl. No.: 13/811,517

(22) PCT Filed: Jul. 26, 2011

(86) PCT No.: PCT/IB2011/053334
§ 371 (c)(1),
(2), (4) Date: Mar. 20, 2013

(87) PCT Pub. No.: WO2012/014160
PCT Pub. Date: Feb. 2, 2012

(65) Prior Publication Data
US 2013/0195014 A1    Aug. 1, 2013

Related U.S. Application Data
(60) Provisional application No. 61/367,765, filed on Jul. 26, 2010.

(51) Int. Cl.
*H04W 48/18*    (2009.01)
*H04L 27/26*    (2006.01)

(52) U.S. Cl.
CPC ........... *H04W 48/18* (2013.01); *H04L 27/2614* (2013.01); *H04L 27/2621* (2013.01)

(58) Field of Classification Search
CPC .............. H04B 2201/70706; H04B 17/001; H04W 52/14; H04W 52/18; H04W 52/52; H04W 52/367; H04W 52/146; H04W 52/16; H04W 52/226; H04W 52/04; H04W 52/246; H04W 52/42; H04W 52/50; H04L 27/0008
See application file for complete search history.

(56) References Cited

U.S. PATENT DOCUMENTS

| | | | |
|---|---|---|---|
| 8,249,190 B2 * | 8/2012 | Seller | 375/298 |
| 2008/0292010 A1 * | 11/2008 | Wernears | 375/260 |
| 2008/0317168 A1 * | 12/2008 | Yang et al. | 375/298 |
| 2010/0034186 A1 | 2/2010 | Zhou et al. | |
| 2010/0232413 A1 * | 9/2010 | Dakshinamurthy et al. | 370/343 |
| 2010/0272048 A1 * | 10/2010 | Pan et al. | 370/329 |

FOREIGN PATENT DOCUMENTS

| | | |
|---|---|---|
| EP | 1357718 A2 | 10/2003 |
| WO | WO 03/019791 A2 | 3/2003 |
| WO | WO 2008/037739 A2 | 4/2008 |
| WO | WO2010/070425 A1 | 6/2010 |

OTHER PUBLICATIONS

International Search Report dated Dec. 16, 2011 corresponding to International Patent Application No. PCT/IB2011/053334.

* cited by examiner

*Primary Examiner* — Curtis A Alia
(74) *Attorney, Agent, or Firm* — Squire Patton Boggs (US) LLP

(57) ABSTRACT

In accordance with an example embodiment of the present invention, a method is disclosed that comprises by using a processor, calculating a plurality of signal states for each of at least two carriers, selecting at least one carrier from the at least two carriers, generating modified signal states for each of the selected at least one carrier by rotating at least one of the respective plurality of signal states with a discrete frequency shift step, determining combinations of signal states of the at least two carriers based at least in part on the modified signal states of the selected at least one carrier, and calculating a cubic metric based on the determined combinations of signal states of the at least two carriers.

19 Claims, 4 Drawing Sheets

APPARATUS AND METHOD FOR CUBIC METRIC ESTIMATOR IN DUAL-CARRIER AND MULTI-CARRIER WIRELESS COMMUNICATION SYSTEM

TECHNICAL FIELD

The present application relates generally to an apparatus and a method for cubic metric estimator in dual-carrier and multi-carrier wireless communication system.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

In wireless communication, different collections of communication protocols are available to provide different types of services and capabilities. High speed packet access (HSPA) is one of such collection of wireless communication protocols that extends and improves the performance of existing UMTS (universal mobile telecommunications system) protocols and is specified by different releases of the standard by the $3^{rd}$ generation partnership project (3GPP) in the area of mobile network technology. The other non-limiting example wireless communication protocols are long term evolution (LTE), global system for mobile (GSM) and worldwide interoperability for microwave access (WiMAX).

Current and future networking technologies continue to facilitate ease of information transfer and convenience to users. In order to provide easier or faster information transfer and convenience, telecommunication industry service providers are developing improvements to existing networks. Carrier aggregation technology has drawn considerable attention in, e.g., HSPA and LTE.

In Release 8 (Rel-8) of HSPA standardization of 3GPP, dual-carrier HSDPA (high speed downlink packet access) was specified by introducing dual-carrier operation in the downlink on adjacent carriers. In an example embodiment, dual-carrier HSPA may be used where a MAC (medium access control) scheduler may allocate two HSPA carriers in parallel and double the communication bandwidth. Besides the throughput gain from double the bandwidth, some diversity and joint scheduling gains may also be expected. This can particularly improve the quality of service (QoS) for end users in poor environment conditions that cannot be gained from other techniques. Similar idea is under consideration in the enhanced LTE technology called LTE-Advanced. Via this technology LTE is expected to improve end-user throughput, increase sector capacity, reduce user plane latency, and consequently offer superior user experience with full mobility.

In Release 9 studies of the HSPA track, a study item termed DC-HSUPA (dual-cell high speed uplink packet access) for uplink dual carrier UE (user equipment) operation has been launched. In DC-HSUPA, the UE may be assigned one or two uplink carriers for data transmission if the UE is dual carrier capable. As compared to downlink dual-carrier operation, where the UE is required to receive the dual-carrier transmission transmitted by the Node B or base station, in the uplink the UE is power limited and thus it needs to share its transmission power among the carriers if it transmits on both carriers simultaneously.

Power amplifier (PA) of the transmitter is non-linear, which causes distortion that degrades the error vector magnitude (EVM) and increases spurious emissions (SE). Signals that have higher peak to average ratio (PAR) will also have a higher linearity requirement for the PA. There are two possibilities to meet the higher linearity requirement: either the PA is designed to be more linear or the operating point of the existing PA has to be set so that the signals do not get distorted. As the PAs become more expensive from the cost and power consumption point of view when the linearity of the PA is increased, it may be more desirable to use the existing PA designs. The distortion, and thus EVM and SE, of the PA may be controlled by adjusting its operating point. Typically, when PAR of the base band signal increases the operating point of the PA has to be adjusted towards more linear region in order to maintain EVM and adjacent channel leakage ratio (ACLR). This adjustment can be done by increasing an output back-off of the PA.

An example of the increase of PAR is in an HSPA communication, when the HS-DPCCH (high speed dedicated physical control channel) and E-DPDCH (E-DCH dedicated physical data channel, wherein E-DCH stands for enhanced dedicated channel) channels are multiplexed into the Release 99 channels. For high power levels this may cause the power amplifier to work in non-linear region, thus may increase ACLR and spectrum mask leakage. In order to tackle this problem and to enable to use PAs that have been designed for the Release 99, the standard allows the UE to reduce the maximum transmit power when HS-DPCCH and/or E-DCH are present.

The calculation of maximum power reduction (MPR) involves the cubic metric (CM). The CM value approximates the 3rd order non-linearity of PA and enables to generalize the amount of PA back-off allowed to fulfill the ACLR requirements.

The cubic metric may be computationally complex and it may need to be calculated every time the channel gain factors change. For example, in HSPA, the calculation of CM for every transmission time interval (TTI) would be enough. However, because the HS-DPCCH transmission may change on every slot, CM may need to be determined for every slot. Furthermore, if the E-DPDCH scaling occurs, the cubic metric may need to be re-calculated within the current slot before the data is to be transmitted. A method that calculates CM for single band or carrier scenario is described in the related application with U.S. patent application Ser. No. 12/453,433, titled "Apparatus, system, and method for calculating a non-linearity metric". This method utilizes the channel gain factors, determines the constellation points (i.e., the signal states to be transmitted) and calculates the cubic metric on the basis of the constellation points.

SUMMARY

Various aspects of examples of the invention are set out in the claims.

According to a first aspect of the present invention, a method may include by using a processor, calculating a plurality of signal states for each of at least two carriers, selecting at least one carrier from the at least two carriers, generating modified signal states for each of the selected at least one carrier by rotating at least one of the respective plurality of signal states with a discrete frequency shift step, determining combinations of signal states of the at least two carriers based at least in part on the modified signal states of the selected at least one carrier, and calculating a cubic metric based on the determined combinations of signal states of the at least two carriers.

According to a second aspect of the present invention, an apparatus may include at least one processor, and at least one memory including computer program code, wherein the at least one memory and the computer program code configured to, with the at least one processor, cause the apparatus at least to calculate a plurality of signal states for each of at least two carriers, select at least one carrier from the at least two carriers, generate modified signal states for each of the selected at least one carrier by rotating at least one of the respective plurality of signal states with a discrete frequency shift step, determine combinations of signal states of the at least two carriers based at least in part on the modified signal states of the selected at least one carrier, and calculate a cubic metric based on the determined combinations of signal states of the at least two carriers.

According to a third aspect of the present invention, a computer program product comprising a computer-readable medium bearing computer program code embodied therein for use with a computer, the computer program code may include code for calculating a plurality of signal states for each of at least two carriers, code for selecting at least one carrier from the at least two carriers, code for generating modified signal states for each of the selected at least one carrier by rotating at least one of the respective plurality of signal states with a discrete frequency shift step, code for determining combinations of signal states of the at least two carriers based at least in part on the modified signal states of the selected at least one carrier, and code for calculating a cubic metric based on the determined combinations of signal states of the at least two carriers.

According to a fourth aspect of the present invention, an apparatus may include a means for calculating a plurality of signal states for each of at least two carriers, a means for selecting at least one carrier from the at least two carriers, a means for generating modified signal states for each of the selected at least one carrier by rotating at least one of the respective plurality of signal states with a discrete frequency shift step, a means for determining combinations of signal states of the at least two carriers based at least in part on the modified signal states of the selected at least one carrier, and a means for calculating a cubic metric based on the determined combinations of signal states of the at least two carriers.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
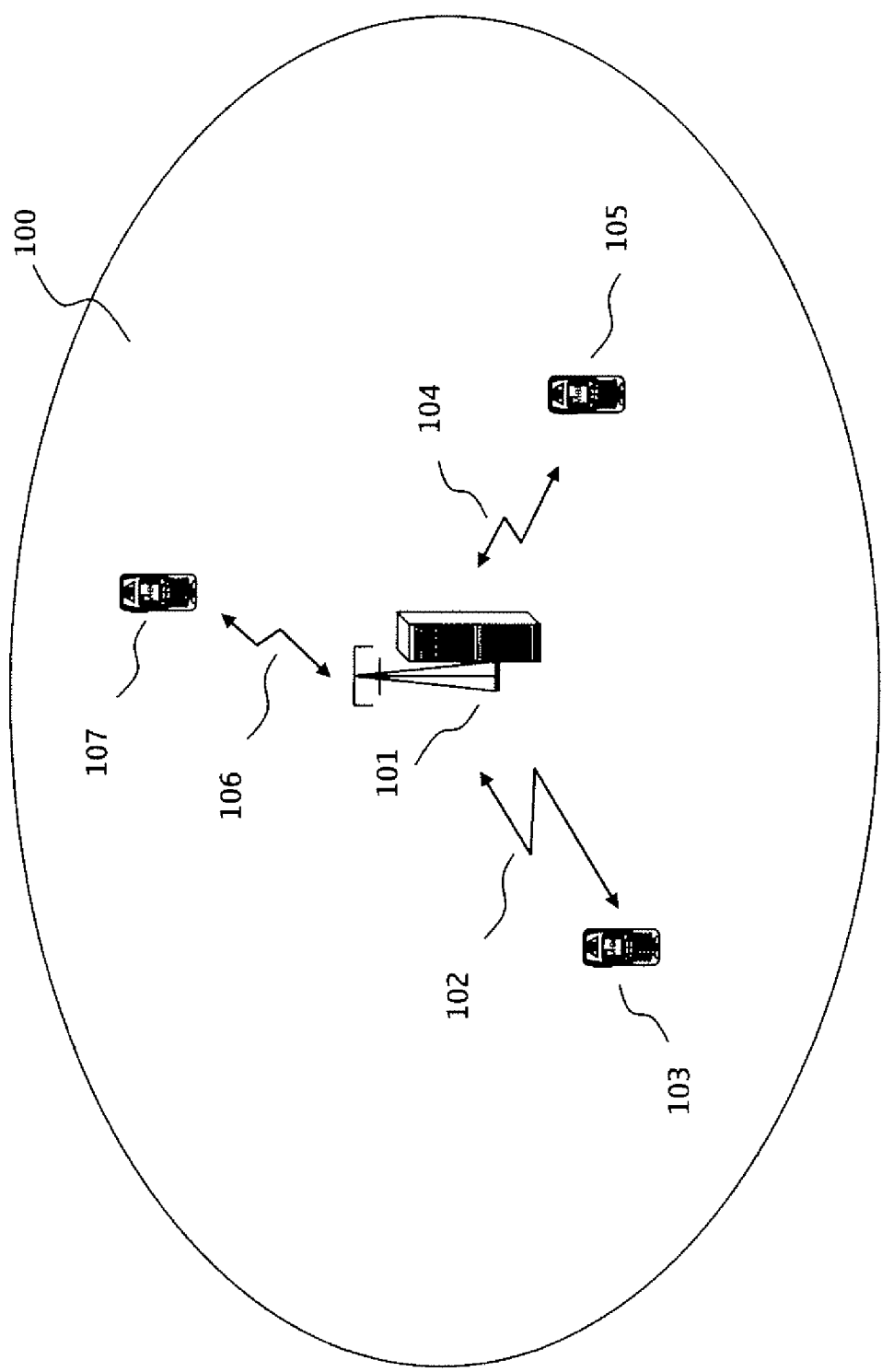
FIG. 1 illustrates an example wireless system.

FIG. 1 depicts an example wireless system 100. Wireless system 100 comprises a Node B or base station 101 and a plurality of user equipments (UEs) 103, 105 and 107. Although just one Node B and three UEs are shown in FIG. 1, the wireless system 100 may comprise more Node Bs and more or less UEs. In one example embodiment, the Node B 101, possibly together with other Node Bs and one or more radio network controllers, comprises the UMTS (universal mobile telecommunications system) terrestrial radio access network (UTRAN). In the context of this disclosure, the Node B 101 communicates with the UEs 103, 105 and 107 via bidirectional communication channels or links 102, 104 and 106, respectively. While some of the UEs, for example, the UEs 105 and 107, may be conventional UEs that communicate with the Node B 101 in one carrier frequency or band for each of the downlink and uplink direction, at least one UE, for example, the UE 103, may be allocated dual or multiple carriers for at least its uplink communication channel 102. Therefore, in an example embodiment, the Node B 101 may allocate a communication carrier to each UE, e.g., UE 105 and 107. In an embodiment, the Node B 101 may allocate a plurality of communication carriers to a UE, e.g., UE 103. In such an embodiment, the increase in the number of allocated communication carriers may correlate with an increase in communication bandwidth. A throughput gain from the increase in the bandwidth allocated to a UE may be expected. In an example embodiment, the increased bandwidth, due to the plurality of communication carriers may allow for some diversity and joint scheduling gains.

In an example embodiment, multiple code channels may be multiplexed and transmitted on at least one of the allocated dual or multiple carriers of UE 103. The code channel can be, for example, in an HSPA system, dedicated physical control channel (DPCCH), high speed dedicated physical control channel (HS-DPCCH), E-DCH dedicated physical control channel (E-DPCCH), wherein E-DCH stands for enhanced dedicated channel, or E-DCH dedicated physical data channel (E-DPDCH). For uplink communication, the UE 103 generates in baseband an information signal to be transmitted for each of the code channels. The UE 103 also scales the signals by their respective gain factors (beta factors) according to certain scheduling information.

For single-carrier HSUPA (high speed uplink packet access), 3GPP TS 25.101 Chapter 6.2.2., incorporated by references herein, sets the requirements for the cubic metric (CM). How the CM is actually computed or estimated is vendor dependent, but the methods have to be based directly or indirectly on the signal states, e.g., the constellation points, and beta values of the code channels.

In 3GPP TS25.101, cubic metric is given by $$CM=CEIL\{[20*\log 10((v\_norm^3)_{rms})-20*\log 10((v\_norm\_ref^3))]/k, 0.22\} \quad (1)$$

where CEIL$\{x, 0.22\}$ means rounding upwards to closest 0.22 dB with 0.5 dB granularity, v_norm and v_norm_ref are the normalized voltage waveforms of the input signal and the reference signals, respectively, $(x)_{rms}$ denotes root mean square (RMS) value of x, and $20*\log 10((v\_norm\_ref^3)_{rms})$ and k are constants. $(v\_norm^3)_{rms}$ is calculated based on the signal states of code channels.

For UE 103, the introduction of dual or more carriers increases the computational complexity of cubic metric even further. In an example embodiment for dual carriers allocation, the two carriers are shifted in frequency (+2.5 MHz, −2.5 MHz), which means that the number of transmitted signal states becomes infinite, as the constellations of the first and the second carrier rotate in respect with each other.

In an example embodiment, the computation of the cubic metric takes into account the constellation points of two carriers, their rotation in respect with each other and the combined constellation points. In an example embodiment, a rotation with discrete step may be applied to the constellation points of one of the two carriers and to produce the combined constellation points, i.e., combined signal states. The cubic metric may be further calculated from the combined signal states as described in the related application with U.S. patent application Ser. No. 12/453,433, titled "Apparatus, system, and method for calculating a non-linearity metric". In an example embodiment, the rotation is preferably applied to the constellation points of the carrier that has a fewer number of constellation points. The accuracy of the approximation in respect to the computational complexity can be adjusted by selecting the rotation step correspondingly.

Figure 2:
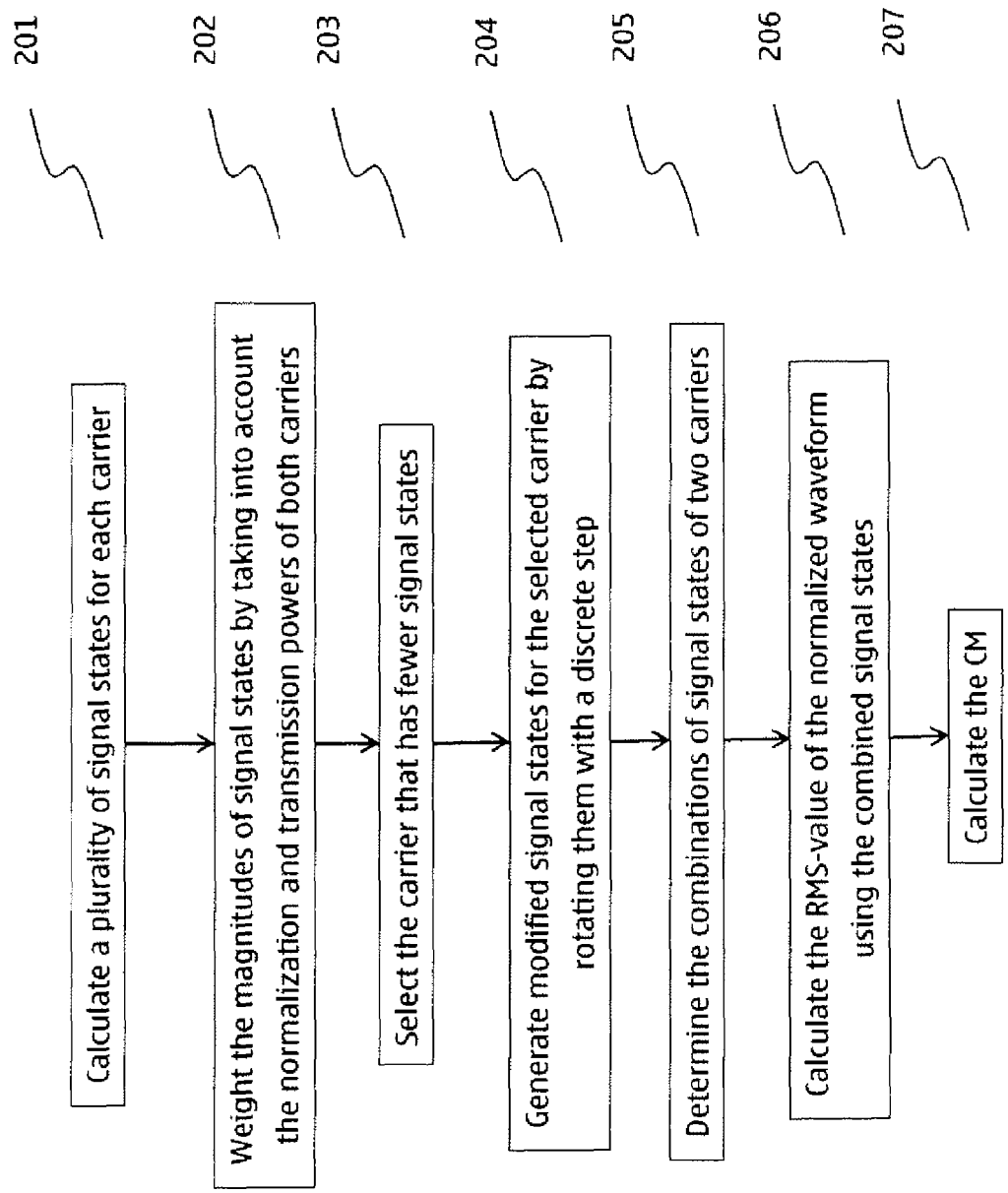
FIG. 2 illustrates an overview of cubic metric calculation for dual-carrier high speed uplink packet access according to an example embodiment of the invention.

FIG. 2 illustrates an overview of CM calculation for dual-carrier HSUPA according to an example embodiment of the invention. At 201, a plurality of possible computational signal states for each carrier are calculated. In one example embodiment, only part of all possible computational signal states, for example, one fourth of the signal states, for each carrier are calculated. The calculation may be prior to scrambling, spreading and root raised cosine (RRC) filtering operations of a UE, e.g., the UE 103 in FIG. 1. Only part of the signal states are useful because the rest of the signal states produce redundant information due to the symmetry of the constellation diagram. The number of the signal states depends on the number of active code channels.

At 202, the magnitudes of signal states are weighted by taking into account the normalization and the requested transmission powers of both carriers. In an example embodiment, this may be done basically in the following way: keep a carrier, for example, the first caner, as a reference carrier, and weight the computational signal states of the second carrier by the factor $$u = \sqrt{\frac{P_2}{P_1}} \cdot \sqrt{\frac{\beta_{1,1}^2 + \beta_{1,2}^2 + \ldots + \beta_{1,L_1}^2}{\beta_{2,1}^2 + \beta_{2,2}^2 + \ldots + \beta_{2,L_2}^2}},$$

where $\beta_{j,l}^2$ denotes the square of lth beta factor on jth carrier and $L_j$ is the number of active channels on jth carrier. $P_1$ and $P_2$ denote the requested transmission powers of the first and second carrier, respectively.

At 203, the carrier that has fewer signal states is selected. At 204, in order to approximate the effect of the frequency shift between the two carriers, the calculated signal states on the selected carrier are rotated with a discrete step, for example, with an angle of 5, 10 or 22.5 degree. In an example embodiment, only one fourth of signal states on the selected carrier are rotated. The adopted angle affects the accuracy of the CM estimation algorithm. By 204, modified signal states of the selected carrier are generated. At 205, all possible combinations between the modified signal states of the selected carrier and the signal states of the carrier having higher number of signal states are determined.

At 206, the RMS value of the normalized waveform, $(v\_norm^3)_{rms}$, is calculated based on the combined signal states generated at 205. The CM then can be calculated as a function of $(v\_norm^3)_{rms}$, for example, according to the equation (1).

Figure 3:
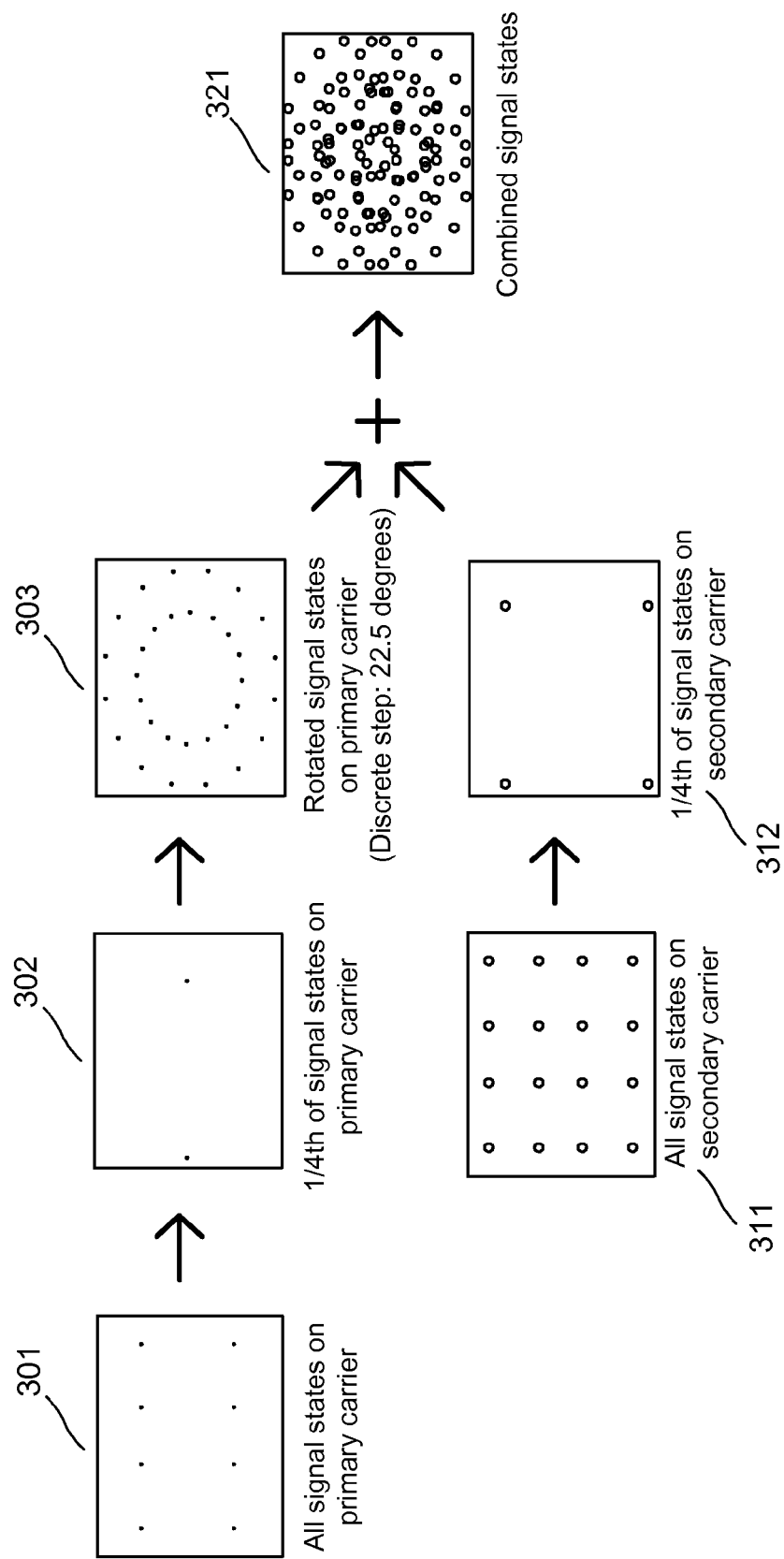
FIG. 3 depicts an example how the combined signal states of two carriers can be generated according to an example embodiment of the invention.

FIG. 3 depicts an example how the combined signal states of two carriers can be generated according to an example embodiment of the invention. In FIG. 3, one carrier is assumed to be the primary carrier and the other carrier is assumed to be the secondary carrier. In this example, the primary carrier has one code channel mapped to the quadrature branch (Q-branch) of the transmission path of a UE, e.g., the UE 103 in FIG. 1, and two code channels mapped to inphase branch (I-branch) of the transmission path of the UE. The secondary carrier has two code channels, each of which is mapped to both Q-branch and I-branch. A binary phase shift keying (BPSK) modulation is applied to all code channels in this example.

Because a BPSK modulated code channel has two signal states, the primary carrier in the example of FIG. 3 has totally 8 signal states, as shown at block 301. Similarly, the secondary carrier has totally 16 signal states, as shown at block 311. In an example embodiment, the primary carrier is selected for rotation of signal states since it has fewer number of signal states. In an example embodiment, only one fourth of signal states on the primary carrier, i.e., two signal states are used, as shown at block 302. In the example of FIG. 3, a frequency shift step of 22.5 degree is adopted, which results in the modified signal states of the primary carrier as illustrated at block 303. The modified signal states of the primary carrier are combined with one fourth of the signal states of the secondary carrier, which are shown at block 312. Finally, the result of combination is described at block 321 and it can be used to calculate the RMS value of the waveform, thus, the cubic metric.

In an example embodiment of the invention, the number of combined signal states for dual-carrier system can be computed as $\frac{1}{4} \times N_1 \times \frac{1}{4} \times N_2 \times R$, where $N_1$ and $N_2$ are the number of signal states of the first and the second carrier, respectively. The value of $N_1$ and $N_2$ depend on the number of active code channels and the applied modulation on each code channel. R indicates how many "modified" or "rotated" signal states can be generated from each original signal state of a selected carrier. In an example embodiment, R is equal to 360/(discrete step), and the discrete step may be, for example, 5, 10 or 22.5 degree. In the example illustrated by FIG. 3, the discrete step is 22.5 degree and R is equal to 16. Each state of the selected carrier, the primary carrier in the example of FIG. 3, is multiplied by $e^{j2n\pi/16}$, where n=0, 1, . . . 15. Therefore, 16 modified signal states are generated for each original state of the primary carrier. It can be noted that the smaller the discrete step, the more the number of combined signal states. It should be understood that the examples using the number of signal states and other concrete values are merely for illustrative purposes. Other values are also possible.

Figure 4:
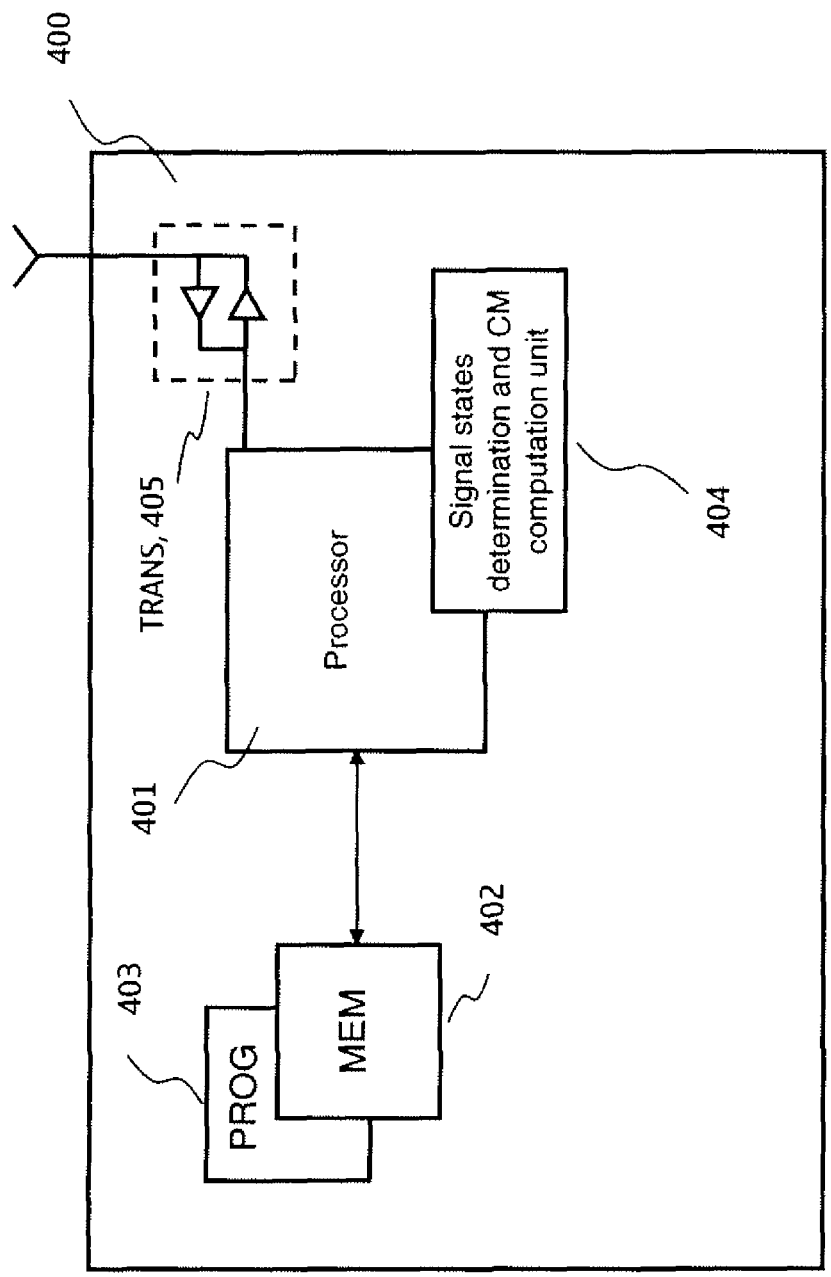
FIG. 4 shows a simplified block diagram of an electronic apparatus in accordance with an example embodiment of the invention.

Reference is made to FIG. 4 for illustrating a simplified block diagram of an electronic apparatus 400 in accordance with an example embodiment of the invention. In an example embodiment, the apparatus may be a mobile communication device which may be referred to as the UE 103. The apparatus 400 includes a processor 401 and a memory (MEM) 402 coupled to the processor 401 that stores a program of computer instructions (PROG) 403. The apparatus 400 may further include a suitable transceiver (TRANS) 405 (having a transmitter (TX) and a receiver (RX)) coupled to the processor 401. The TRANS 405 is for bidirectional wireless communications with other communication devices that are not shown in FIG. 4.

As shown in FIG. 4, the apparatus 400 may further include a signal states determination and cubic metric computation unit 404. The signal states determination and cubic metric computation unit 404, together with the processor 401 and the PROG 403, is configured to perform the determination of combined signal states and computation of the cubic metric in a similar way as illustrated by FIG. 2.

The PROG 403 is assumed to include program instructions that, when executed by the associated processor, enable the electronic apparatus to operate in accordance with the example embodiments of this disclosure, as discussed herein.

In general, the various example embodiments of the apparatus 400 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software executable by the processor 401 of the apparatus 400, or by hardware, or by a combination of software and hardware.

The MEM 402 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor 401 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be allowing the cubic metric to be computed with reasonable complexity for dual-carrier and multiple-carrier communication devices. This allows the device to determine the trade-off between the accuracy requirements and computational complexity.

Embodiments of the present invention may be implemented in software, hardware, application logic or a combination of software, hardware and application logic. The software, application logic and/or hardware may reside on an apparatus such as a user equipment, a Node B/base station or other mobile communication devices. If desired, part of the software, application logic and/or hardware may reside on a user equipment 400, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

For example, while the example embodiments have been described above in the context of the HSUPA system for uplink transmission, it should be appreciated that the example embodiments of this invention are not limited for use with only this one particular type of wireless communication system, and that they may be used to advantage in other wireless communication systems and in downlink transmission. Although two carriers are assumed in FIGS. 2 and 3 for illustration purpose, the example embodiments of this invention are also suitable for use with more than two carriers.

Further, the various names used for the described parameters are not intended to be limiting in any respect, as these parameters may be identified by any suitable names. Further, the various names assigned to different channels (e.g., E-DPCCH, etc.) are not intended to be limiting in any respect, as these various channels may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

What is claimed is:

1. A method, comprising:
by using a processor,
calculating a plurality of signal states for each of at least two carriers, including weighting the magnitudes of the plurality of signal states by taking into account the normalization and transmission powers of the at least two carriers;
selecting at least one carrier from the at least two carriers;
generating modified signal states for each of the selected at least one carrier by rotating at least one of the respective plurality of signal states with a discrete frequency shift step;
determining combinations of signal states of the at least two carriers based at least in part on the modified signal states of the selected at least one carrier; and
calculating a cubic metric based on the determined combinations of signal states of the at least two carriers.

2. The method of claim 1, wherein the selecting at least one carrier further comprises:
selecting the at least one carrier based at least in part on the number of the signal states.

3. The method of claim 1, wherein the selecting at least one carrier further comprises:
selecting the at least one carrier with a fewer number of the signal states.

4. The method of claim 1, wherein the generating modified signal states further comprises:
rotating only part of the respective signal states of each of the selected at least one carrier.

5. The method of claim 1, wherein the generating modified signal states further comprises:
rotating one fourth of the respective signal states of each of the selected at least one carrier.

6. The method of claim 1, wherein the generating modified signal states further comprises:
determining a plurality of multipliers based at least in part on the discrete frequency shift step; and multiplying at least one of the respective signal states by the plurality of multipliers.

7. The method of claim 1, wherein calculating the cubic metric further comprises:
   calculating an RMS-value of a normalized waveform by using the determined combinations of signal states.

8. An apparatus, comprising:
   at least one processor;
   and at least one memory including computer program code,
   wherein the at least one memory and the computer program code are configured to, with the at least one processor, cause the apparatus at least to:
   calculate a plurality of signal states for each of at least two carriers, including weighting the magnitudes of the plurality of signal states by taking into account the normalization and transmission powers of the at least two carriers;
   select at least one carrier from the at least two carriers;
   generate modified signal states for each of the selected at least one carrier by rotating at least one of the respective plurality of signal states with a discrete frequency shift step;
   determine combinations of signal states of the at least two carriers based at least in part on the modified signal states of the selected at least one carrier; and
   calculate a cubic metric based on the determined combinations of signal states of the at least two carriers.

9. The apparatus of claim 8, wherein the select at least one carrier further comprises:
   select the at least one carrier based at least in part on the number of the signal states.

10. The apparatus of claim 8, wherein the select at least one carrier further comprises:
   select the at least one carrier with a fewer number of the signal states.

11. (Previously Presented The apparatus of claim 8, wherein the generate modified signal states further comprises:
   rotate only part of the respective signal states of each of the selected at least one carrier.

12. The apparatus of claim 8, wherein the generate modified signal states further comprises:
   rotate one fourth of the respective signal states of each of the selected at least one carrier.

13. The apparatus of claim 8, wherein the generate modified signal states further comprises:
   determine a plurality of multipliers based at least in part on the discrete frequency shift step; and multiplying at least one of the respective signal states by the plurality of multipliers.

14. A computer program product comprising a non-transitory computer-readable medium bearing computer program code embodied therein for use with a computer, the computer program code comprising:
   code for calculating a plurality of signal states for each of at least two carriers, including weighting the magnitudes of the plurality of signal states by taking into account the normalization and transmission powers of the at least two carriers;
   code for selecting at least one carrier from the at least two carriers;
   code for generating modified signal states for each of the selected at least one carrier by rotating at least one of the respective plurality of signal states with a discrete frequency shift step;
   code for determining combinations of signal states of the at least two carriers based at least in part on the modified signal states of the selected at least one carrier; and
   code for calculating a cubic metric based on the determined combinations of signal states of the at least two carriers.

15. The computer program product of claim 14, wherein the computer program code for selecting at least one carrier further comprises:
   code for selecting the at least one carrier based at least in part on the number of the signal states.

16. The computer program product of claim 14, wherein the computer program code for selecting at least one carrier further comprises:
   code for selecting the at least one carrier with a fewer number of the signal states.

17. The computer program product of claim 14, wherein the computer program code for generating modified signal states further comprises:
   code for rotating only part of the respective signal states of each of the selected at least one carrier.

18. The computer program product of claim 14, wherein the computer program code for generating modified signal states further comprises:
   code for rotating one fourth of the respective signal states of each of the selected at least one carrier.

19. The computer program product of claim 14, wherein the computer program code for generating modified signal states further comprises:
   code for determining a plurality of multipliers based at least in part on the discrete frequency shift step; and
   code for multiplying at least one of the respective signal states by the plurality of multipliers.

* * * * *